United States Patent Office 2,801,970
Patented Aug. 6, 1957

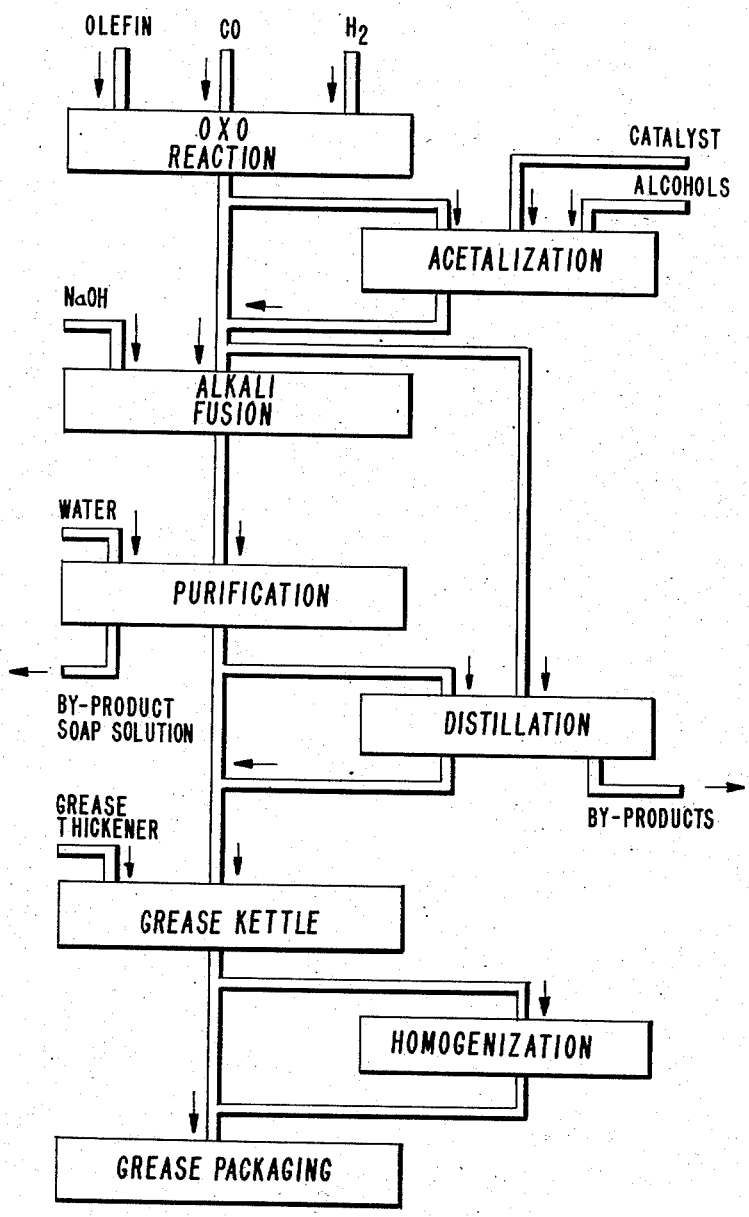

2,801,970

PREPARATION OF LUBRICATING GREASE COMPOSITIONS FROM OXO REACTION PRODUCTS

Jeffrey H. Bartlett, Westfield, Arnold J. Morway, Clark, and John C. Munday, Cranford, N. J., assignors to Esso Research and Engineering Company, a corporation of Delaware Application November 27, 1953, Serial No. 394,710

5 Claims. (Cl. 252—40.5)

This invention relates to new and improved lubricating grease compositions and to a process for their preparation. Particularly, the invention relates to new and improved lubricating grease compositions which comprises a mixture of acetals derived from the Oxo stage product of the Oxo process thickened to a grease consistency with a grease forming soap.

It has been known to the art that oxygenated organic compounds may be made by reacting together carbon monoxide, hydrogen, and an olefinic hydrocarbon to form an intermediate product which may be subsequently hydrogenated or reduced to an alcohol having one more carbon atom than the starting olefin. This reaction is carried out in the presence of a cobalt-containing catalyst, or equivalent catalyst, in a two stage reaction. The product from the first reaction contains a large amount of aldehydes and smaller amounts of alcohols, esters, and acetals. In the second stage the product of the first, or Oxo stage, is hydrogenated or reduced to the corresponding alcohol containing one more carbon atom than the original olefin.

These reactions may be simply represented for a monoolefinic feed as follows, it being understood that other reactions may take place to a minor extent:

First stage:

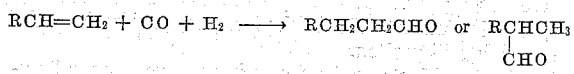

Second stage:

or

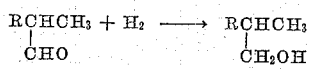

It is evident from the above equations that a primary alcohol containing one more carbon atom than the starting monoolefin will result, and that the position in the molecule of the added group will depend on the position of the double bond in the original olefin, or the position to which the double bond may shift by isomerization under the reaction conditions used.

The olefinic feed for the above reactions may be olefins such as heptenes, octenes, nonenes, decenes, dodecenes, tetradecene and high olefins, olefin polymers, such as diisobutylene, triisobutylene, polypropylenes and olefinic fractions from hydrocarbon synthesis process, from the thermal or catalytic cracking of petroleum oil, petrolatum, wax, etc., and from other sources.

Of particular interest are the polymers and copolymers of $C_3$ and $C_4$ olefins. These monoolefins are readily available in petroleum refinery streams and processes for their conversion to liquid copolymers have been described by the art. One such process, known as U. O. P polymerization, consists of passing the olefin-containing stream in liquid phase in contact with an acid catalyst comprising phosphoric acid impregnated on kieselguhr. Other acidic catalysts, such as phosphoric acid or copper phosphate impregnated on silica gel, sulfuric acid, Friedel-Crafts catalysts, activated clays, silica-alumina, copper pyrophosphate, etc. may be used. Suitable conditions when employing phosphoric acid catalysts of the U. O. P. type are temperatures of 300° F. to 500° F., pressures of from 250 to 5,000 p. s. i. and feed stocks comprising refinery streams containing propylene and mixed butylenes. Suitable feed stocks, for example, may contain from 15 to 60 mol percent propylene, from 0.5 to 15 mol percent butylenes, and from 0.1 to 10 mol percent isobutylene, the remainder being saturated hydrocarbons. Other suitable feed stocks are the dimer and trimer of isobutylene. Propylene polymers are especially useful.

The carbon monoxide and hydrogen may be manufactured by conventional methods from many materials, such as coke, coal, lignite, or hydrocarbon gases, such as natural gas or methane. The solid materials may be converted by known methods into carbon monoxide and hydrogen by treatment with steam and/or carbon dioxide. The ratio of carbon monoxide to hydrogen may be varied by varying the amount of steam used to react with the solid material so that a part of the carbon monoxide may react with the steam to form carbon dioxide and hydrogen. Thus the molar ratio of hydrogen to carbon monoxide is increased. The carbon dioxide may be removed by scrubbing the gaseous mixture with aqueous ethanolamine or other basic substances. The hydrocarbon gases may be converted to hydrogen and carbon monoxide in a number of ways, such as treatment with oxygen, carbon dioxide, or steam, or a combination of steam and carbon dioxide, catalytically, in accordance with known procedures.

In the first stage of the reaction, or the aldehyde synthesis stage, hereinafter referred to as the Oxo stage, the ratio of hydrogen to carbon monoxide employed may vary appreciably. Ratios of 0.5 volume to 2.0 volumes of hydrogen per volume of carbon monoxide may be employed. The preferred ratio comprises about 1.0 volume of hydrogen per volume of carbon monoxide. The quantities of olefins employed per volume of carbon monoxide and hydrogen likewise may vary considerably, as may the composition of the olefin feed stream. The olefin feed, as mentioned above, may comprise pure olefins, or may comprise olefins containing paraffinic and other hydrocarbons. In general, it is preferred that the olefin feed stock comprise olefins having from 6 to 24 carbon atoms per molecule, with a particularly desirable feed comprising olefins having from about 8 to about 18 carbon atoms per molecule.

The Oxo stage is generally carried out at pressures ranging from about 100 to about 300 atmospheres and at temperatures in the range of about 200° F. to about 400° F. The quantity of hydrogen plus carbon monoxide with respect to the olefin utilized may vary considerably, as for example, from 1000 to 45,000 standard condition cubic feet of the mixture per barrel of liquid olefin. In general, however, approximately 2500 to 15,000 cubic feet of carbon monoxide-hydrogen gas per barrel of olefin feed is used.

It is with the products of the first, or Oxo, stage of the above described Oxo process that the instant invention is concerned. It has been found, and forms the object of this invention, that the Oxo stage product may be converted into a synthetic lubricant which serves as an excellent base for lubricating grease compositions. The conversion is accomplished by a simple process which is described in more detail below.

The Oxo stage product from the oxonation of a $C_7$ olefin copolymer of propylene and butylene has been found to comprise a mixture of components which is approximately as follows:

| | Percent |
|---|---|
| Unreacted olefins | 20 |
| Aldehydes | 35 |
| Alcohols | 10 |
| Esters | 10 |
| Acetals | 15 |
| Higher alcohols, glycols, ethers, etc. | 10 |

The process of the instant invention has as its object the conversion of this mixture of products to the acetal component, said process comprising the following steps:

Step 1.—Removal of light hydrocarbons

The olefinic constituent of the mixture of products of the Oxo stage are preferably, but not necessarily, removed by topping in a distillation step. The temperature of this distillation step will be governed by the starting olefin used.

Step 2.—Recovery of the acetal component

Although it is possible to recover the acetal component of the Oxo stage mixture directly by a fractional distillation step, a purer product may be obtained by an alkali fusion step in which the alcohols, aldehydes and esters are converted into the corresponding alkali soaps. The acetals are unreactive under fusion conditions, and are easily recovered, for example, by pouring the hot melt into water. The soaps dissolve in the water and the insoluble acetals are separated therefrom. The acetals may be further purified, if desired, by a distillation step. However, in order to obtain better yields from the total charge of Oxo stage products, an acetalization step may be used as follows:

The Oxo stage product, having been topped to remove unreacted hydrocarbons, if desired, is admixed with sufficient catalyst of an acidic nature, such as toluene sulfonic acid, sodium acid sulfate, anhydrous hydrogen chloride, etc., with the former being preferred, so as to make the total mixture acidic. The mixture is then heated to increase the rate of reaction between aldehydes and alcohols, and to drive off the water formed in the acetalization reaction:

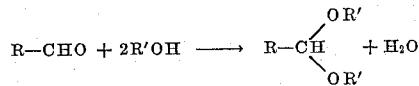

If desired, a water-entraining agent such as toluene or naphtha may be used to assist in the dehydration. Depending upon the constituents of the mixture of Oxo stage products, it may be desirable to add sufficient alcohol or aldehyde of about 6 to 18 carbon atoms to insure complete utilization of all the available material in the Oxo stage product. For example, when the Oxo stage product contains less than the two mols of alcohol per mol of aldehyde required for acetalization, the deficiency is corrected by adding extraneous alcohol. The added alcohol or aldehyde, as the case may be, can be branched such as Oxo products or they can be straight chained such as normal octyl through octadecyl alcohols.

After the acetalization reaction is completed, sufficient alkali metal hydroxide is added to saponify the ester component of the product and to convert any aldehydes and/or alcohols remaining to soaps of the corresponding acids. The temperature is then raised to fusion temperatures, i. e., in the range from about 500° F. to about 650° F. This temperature is maintained for about ½ to about 10 hours, or until hydrogen evolution ceases, after which the total mixture is poured into an excess volume of water. The fusion reactions are illustrated below:

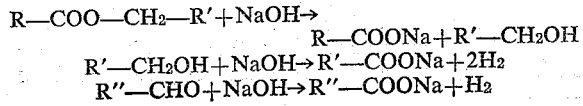

An excess of about 5% to 100% alkali is employed, the excess being based on the free alcohols plus the alcohols released by saponification.

The soaps dissolve in the water and the acetal layer is removed by decantation from the water layer, or the total mixture may be extracted with a solvent for the acetals, such as petroleum ether, and the extract evaporated to recover the acetals.

In the accompanying drawing a flow plan of the process of the instant invention is diagrammatically presented.

In one embodiment of this invention there is charged to a grease kettle, a solvent, such as a white oil, and the desired amount of sodium hydroxide, usually in the form of a solid. The mixture is heated to about 620° F. and the Oxo stage product is added slowly with stirring. The elevated temperature is maintained for about three hours, at which time hydrogen evolution is substantially complete. The hot melt is then poured into 5 to 10 volumes of water and the mixture is agitated. The total charge is then allowed to settle and to separate into an upper acetal layer and a lower water layer. The water layer, containing the soap and any unreacted ingredients that are water soluble, is decanted, leaving behind the acetal mixture. To this acetal mixture a grease forming amount, usually 5% by weight to 20% by weight, of a preformed soap is added and the mixture is again heated with stirring to about 500° F. to dissolve the soap. It is desired that the mixture be neutral, preferably alkaline. The mass is then allowed to cool and may be homogenized to obtain the finished grease composition.

The soap used to body the grease composition of the invention may be any of the commonly known soaps known to the art. Alkali or alkaline earth metal soaps of fatty acids such as hydrogenated fish oil acids, stearic acid, oleic acid, hydroxy stearic acid, beef fat, tallow, the saturated or unsaturated glycerides of various fatty acids or mixtures of the above. The commonly used complex soaps formed with high molecular weight fatty acids and low molecular weight salts, such as salts of acetic, furoic, butyric acid, and the like may also be used. Various additive materials to enhance special properties of the grease compositions may also be added to the instant grease. Oxidation inhibitors, tackiness or stringiness agents, extreme pressure agents and the like may be blended with the finished grease, preferably while the soap is still molten.

To further illustrate the inventive concept the following inventive examples are given.

Preparation of the acetal

To a one gallon nickel reactor was charged 555 g. of sodium hydroxide flakes and 500 g. of potassium hydroxide flakes along with 300 g. of a white oil. The temperature of the reactor was raised to about 620° F. and 2000 g. of the $C_7$ Oxo stage product obtained by oxonation of propylene-butylene copolymers, topped to a pot temperature of about 110° F. at 100 mm./Hg were added slowly over a 4-hour period. After the addition was completed the heat was cut off and the mixture allowed to soak for several hours. The product was then poured into 10 liters of water. The mixture was then extracted with 3.5 liters of petroleum ether and then with 2.5 liters more. The extracts were then evaporated yielding 1349 g. of acetals. From this product 1219 g. were distilled in a short path still and this material was fractionated. The fraction boiling between 266° F. and 320° F., 701 g., had a carbonyl number of 213 centi-equivalents per gram and a hydroxyl number of 0.008 centi-equivalents per gram. The material contained a high proportion of $C_{24}$ acetal.

*Example 1.*—A complex lithium soap was prepared by coneutralizing hydrogenated fish oil acids and glacial acetic acid in a ratio of 66.2% to 13.3% respectively with 20.5% of lithium hydroxide monohydrate and drying. This soap and the acetals prepared as described above were compounded by blending 12.0% of the soap in 87.0% of the acetals by heating to about 500° F. with stirring. Phenyl alpha-naphthylamine was added in a 1.0% proportion and the grease allowed to cool and was homogenized.

Standard ASTM inspections on this grease composition resulted in the following data:

Penetration (mm./10 at 77° F.):
  Unworked _____ 265.
  Worked (60 strokes with the
    fine hole ASTM worker) _____ 280.
  Worked (100,000 strokes) _____ 340.
ASTM dropping point, °F _____ 420.
A. F. B. M. A. bearing test [1] ____ Excellent; temperatures of 80° F., 220° F., 250° F.; no seal leakage.

[1] A 204 anti-friction ball bearing (sealed on one side) is packed with three grams of the test grease and placed on a filled vertical shaft (slip fit) and retained by a lock nut. The shielded side faces down. An oil jacketed fitted cup is then raised surrounding the bearing. The bearing is turned by an electric motor attached to the shaft at 1860 R. P. M. Heat is applied to the outer shell of the oil bath and the bath maintained at the various test temperature for 30 minutes. During the test the grease structure is noted and after the test any leakage of oil through the bearing seal or fluidization of the grease is noted in the bottom of the cup.

To summarize briefly, the instant invention relates to new and improved lubricating grease compositions and to a process for their manufacture. Particularly, the invention relates to a lubricating grease composition prepared by thickening to a grease consistency the acetals derived from the reaction product of an olefin with carbon monoxide and hydrogen in the Oxo process with from 10.0% to 20.0% by weight of a grease forming soap. More particularly, the invention relates to an improved process which comprises the steps of reacting an olefin with carbon monoxide and hydrogen in the Oxo process, topping the mixture of products so obtained to remove unreacted hydrocarbons, treating the topped product with an alkali metal hydroxide to convert aldehydes and alcohols and esters to the corresponding metal soaps, separating the soaps so formed, and thickening the remaining acetals to a grease consistency with a grease forming amount of a metallic soap of a fatty acid.

If desired, the Oxo stage products may be subjected to an acetalization step to convert any aldehydes and alcohols to acetals, thus increasing the yield of the desired product.

What is claimed is:

1. A process for the preparation of new and useful lubricating grease compositions which comprises the steps of reacting an olefinic hydrocarbon with carbon monoxide and hydrogen in the presence of a carbonylation catalyst at a temperature of about 200° F. to 400° F. and at a pressure of about 200 to about 300 atmospheres to obtain a mixture of products, removing unreacted hydrocarbons from said mixture of products by a distillation step, treating said mixture of products with an excess of an alkali metal hydroxide at a temperature of about 500° F. to 650° F. for about 4 hours, quenching said mixture of products in about 5 to 10 volumes of water, extracting said quenched product with petroleum ether to recover a mixture of acetals, and thickening said mixture of acetals to a grease consistency with from about 5% to about 20% by weight of a mixture of lithium soaps of hydrogenated fish oil acids and the lithium salt of acetic acid.

2. A process which comprises the steps of: reacting an olefinic hydrocarbon with carbon monoxide and hydrogen in the presence of a carbonylation catalyst at a temperature in the range of 200° to 400° F. and at a pressure in the range of 100 to 300 atmospheres to obtain a mixture of products; removing unreacted light hydrocarbons from said mixture of products by distillation; then treating the unreacted hydrocarbon free product with from 5 to 100% excess of an alkali metal hydroxide, said excess being based on free alcohols, at a temperature in the range of 500° F. to 650° F. and for a time in the range of 0.5 to 10 hours to obtain a mixture containing metallic soaps; quenching said mixture containing alkali metal soaps with from about 5 to 10 volumes of water; extracting the quenched aqueous mixture to obtain a mixture of acetals; and thickening said mixture of acetals to a grease consistency with a grease-forming amount of a material selected from the group consisting of an alkali metal soap and an alkaline earth metal soap of a fatty acid.

3. The process of claim 2 wherein said unreacted hydrocarbon free product obtained by distillation is first acidified with an acid and heated to promote acetalization and dehydration before being treated with said alkali metal hydroxide.

4. The process of claim 2 wherein said olefinic hydrocarbon is a $C_7$ polymer of propylene and butylene.

5. The process of claim 2 wherein said alkali metal hydroxide is sodium hydroxide.

References Cited in the file of this patent
UNITED STATES PATENTS

| | | |
|---|---|---|
| 2,594,341 | Owen et al. | Apr. 29, 1952 |
| 2,626,241 | Sparks et al. | June 20, 1953 |
| 2,668,862 | Price | Feb. 9, 1954 |